United States Patent [19]

Pavlikov et al.

[11] 4,187,369

[45] Feb. 5, 1980

[54] PROCESS FOR PRODUCING HYDROCARBON-PHENOL-FORMALDEHYDE RESIN

[76] Inventors: Rudolf Z. Pavlikov, Nizhny Tagil; Natalya V. Shorygiña, Moscow; Vladimir A. Strupinsky, Nizhny Tagil; Anatoly A. Kruglikov, Nizhny Tagil; Jury G. Farbshtein, Nizhny Tagil; Iosif L. Klipinitser, Moscow, all of U.S.S.R.

[21] Appl. No.: 940,641

[22] Filed: Sep. 6, 1978

Related U.S. Application Data

[63] Continuation of Ser. No. 813,769, Jul. 7, 1977, abandoned.

[51] Int. Cl.$^2$ .............................................. C08G 14/14
[52] U.S. Cl. .................................. 528/137; 528/159; 528/160
[58] Field of Search .................. 528/137, 159, 160

[56] References Cited

U.S. PATENT DOCUMENTS 3,406,132  10/1968  Winegartner .................. 528/160 X

OTHER PUBLICATIONS

Noller, Chemistry of Organic Compounds, 1958, pp. 596–597.
Chem. Abstracts, vol. 61, 1964, 2011b–c, Ogii et al.
Chem. Abstracts, vol. 75, 1971, 99102t, Shorygina et al.
Chem. Abstracts, vol. 76, 1972, 60456g, Shorygina et al.
Chem. Abstracts, vol. 76, 1972, 128032y, Shorygina et al.
Chem. Abstracts, vol. 77, 1972, 49250k, Islam et al.

*Primary Examiner*—Howard E. Schain
*Attorney, Agent, or Firm*—Haseltine, Lake & Waters

[57] ABSTRACT

The process according to the present invention comprises a continuous polycondensation of the anthracene fraction of coal tar boiling within the range of from 270° C. to 350° C., phenol and formaldehyde at a weight ratio between the components of 1:3–4:1–1.2 in the presence of 0.5 to 1.2% by weight of an acidic catalyst at a supply rate of a mixture of said components of 500–550 g/hr.

The present invention makes it possible to continuously prepare the desired product, whereby its output from a unit production volume is substantially increased. The product has a high curing rate and a high coke value.

3 Claims, No Drawings

PROCESS FOR PRODUCING HYDROCARBON-PHENOL-FORMALDEHYDE RESIN

This is a continuation, of application Ser. No. 813,769 filed July 7, 1977, now abandoned.

FIELD OF APPLICATION OF THE INVENTION

The present invention relates to processes for producing phenol-formaldehyde resins and, more specifically, to processes of producing hydrocarbon-phenol-formaldehyde resins.

Hydrocarbon-phenol-formaldehyde resins and materials manufactured therefrom are one of the novel types of heat-resistant thermosetting plastics. The presence of fragments of aromatic hydrocarbons of different polycyclicity in the structure of these resins is of a great practical importance for operation of materials and articles made therefrom under the conditions of a lasting thermal treatment. Hydrocarbon-phenol-formaldehyde resins are employed for the production of various compression molding compositions and neat resistant glass and carbon plastics. Articles produced from said materials by injection-molding direct or compression-molding are used in electric, radioelectronic and radiovacuum instruments. Certain parts of these instruments or such instruments as a whole can be operated for an extended period at a temperature within the range of from 170° to 200° C. owing to the use of the above-mentioned materials.

BACKGROUND OF THE INVENTION

Known in the art is a single-phase process for producing hydrocaron-phenol-formaldehyde resins on the basis of binary artificial mixture of aromatic hydrocarbons such as, e.g. naphthalene-phenanthrene, pyrene-fluoranthene, pyrene-coronene, naphthalene-anthracene as well as a commercial eutectic mixture of aromatic hydrocarbons referred to as commercial anthracene. Synthesis of hydrocarbon-phenol-formaldehyde resins is performed periodically by condensation of said eutectic mixtures of aromatic hydrocarbons, phenol and formaldehyde in the presence of an acidic catalyst, i.e. hydrochloric acid contained in the reaction mass in an amount of from 0.5 to 1.2% by weight of the components. The desired product yield is 104% by weight.

This prior art process, however, has certain disadvantages residing in: a low productivity of the process equipment owing to the periodic nature of the operation, a slow rate of curing of the resins resulting in a reduced productivity of the equipment in the processing of materials produced from said resins, and an insufficiently high yield of the desired product.

OBJECT OF THE INVENTION AND BRIEF SUMMARY

It is an object of the present invention to provide a continuous process for producing a hydrocarbon-phenol-formaldehyde resin.

It is another object of the present invention to provide a process which would make it possible to produce a hydrocarbon-phenol-formaldehyde resin possessing a high curing rate and at a high yield.

Still another object of the present invention is to provide such a hydrocarbon component which would be readily available and inexpensive.

A further object of the present invention is to provide a process for producing a hydrocarbon-phenol-formaldehyde resin which would make possible an increased productivity of the process equipment.

These objects are accomplished by a process for producing a hydrocarbon-phenol-formaldehyde resin involving a continuous polycondensation of the anthracene fraction of coal tar boiling at a temperature within the range of from 270° to 350° C., phenol and formaldehyde at a weight ratio of said components of 1:3–4:1–1.2 respectively, in the presence of an acidic catalyst and at a supply rate of a mixture of said components of from 500 to 550 g/hr.

The acidic catalyst used can be sufuric or hydrochloric acid.

The present invention makes it possible to produce a hydrocarbon-phenol-formaldehyde resin in a continuous manner, whereby the product output from a unit production space is considerably increased.

Said resin is rather rapidly cured. Curing time thereof is about 31 sec. This provides an increased capacity of the process equipment for the manufacture of articles from a composition based on said hydrocarbon-phenol-formaldehyde resin.

As has been mentioned hereinbefore, the hydrocarbon component in accordance with the present invention is the anthracene fraction boiling within the range of from 270° to 350° C. obtained from rectification of a coal tar. The anthracene fraction comprises an eutectic mixture of aromatic hydrocarbons and features a relatively low crystallization temperature, i.e. within the range of from 40° to 60° C. It incorporates anthracene, phenanthrene, carbazole, naphthalene, acenaphthene, fluorene, diphenyloxide and associated hydrocarbons. The anthracene fraction is a liquid mobile mass which is readily soluble in a mixture of phenol with formaldehyde. The use of said anthracene fraction makes it possible to substantially increase the rate of reaction of aromatic hydrocarbons with phenol and formaldehyde. Owing to the liquid character of said fraction, the polycondensation reaction can be performed continuously.

The use of the anthracene fraction makes the process for producing hydrocarbon-phenol-formaldehyde resins more simplified and less expensive, since it enables avoiding of separation of individual hydrocarbons and commercial anthracene from said fraction.

The above-mentioned ratios of the anthracene fraction, phenol and formaldehyde, namely 1:3–4:1–1.2, define most satisfactory properties of the final resin. Said ratios appear to be optimal to impart properties of rapid curing to the resin (curing time about 30 sec) and a viscosity optimal for further processing thereof.

Non-compliance with the above-mentioned ratios between the resin components results in the formation of a product possessing impaired properties.

The acidic catalyst used can be sulfuric acid, hydrochloric acid and other acids.

Most preferable, though, is the use of hydrochloric acid as an inexpensive and most efficient catalyst.

A multi-sectional continuous-action column should be used as a reaction apparatus.

DETAILED DESCRIPTION OF THE INVENTION

The process according to the present invention is practically embodied in the following manner.

Said components, i.e. anthracene fraction, phenol and an aqueous solution of formaldehyde in a weight ratio of 1:3–4:1–1.2 are mixed in a blender. The resulting mixture is continuously fed, at a rate of from 500 to 550 g/hr, into a continuous-action column, wherein the polycondensation reaction is conducted in the presence of an acidic catalyst such as sulfuric or hydrochloric acid at reflux. The catalyst content may be varied within the range of from 0.5 to 1.2% by weight. The residence time of the reaction mass in the column ranges from 2 to 2.5 hours.

A crude resin at the outlet of the column is delivered to a settling vessel, wherein separation of water from the resin is effected. In the resulting resin the content of water is 8 to 10% by weight. The resin is further dried in a tubular reactor or a mixing reactor at a temperature of 160° C. under vacuum (residual pressure of 50 mm Hg). The dried resin is cooled and crushed. The thus-produced resin is suitable for the manufacture of compression-molding compositions, glass- and carbon-plastics. Articles made from said materials have a heat resistance of 170° C. (Martens) and specific surface resistivity of $1 \times 10^{-14}$ ohms.

For a better understanding of the present invention, the following example is given by way of illustration.

Into a 25 l mixer there are charged 6 kg of phenol, 1.5 kg of the anthrancene fraction with a boiling temperature of from 270° to 350° C. resulting from rectification of coal tar and 4.55 kg of a 37% aqueous solution of formaldehyde. The ratio between the anthracene fraction, phenol and formaldehyde is 1:4:1.1. The components are intermixed and the resulting mixture is continuously fed at the rate of 550 g/hr to the polycondensation stage. The polycondensation reaction is conducted in a continuous-operation column at reflux, i.e. at the temperature of 99° C. in the presence of 0.006 kg of a 15% aqueous solution of hydrochloric acid.

Vapors of volatile compounds evolved upon reflux of the reaction mixture are condensed in a cooler and the condensate is recycled to the column. Residence time of the reaction mass in the column is 2.5 hours. From the column the reaction mass is fed into a settling vessel, wherein the resin is separated from the accompanying water. The crude resin contains 8% by weight of water. This resin is dried at the temperature of 160° C. under vacuum (residual pressure is 50 mm Hg). The final resin yield is 109% by weight as calculated from the total amount of the reagents, i.e. anthracene fraction and phenol. The resulting resin has the following properties:
1. Ubellohde dropping point—103° C.
2. Viscosity of a 50% alcoholic solution of the resin—120 cpoises
3. free phenol content—2.5 wt.%
4. curing time at the temperature of 150° C.—31 sec.
5. coke value—61%
6. curing degree—97%

The high yield of the resin is caused by a higher conversion rate of the hydrocarbons incorporated in the anthracene fraction. The continuous character of the process makes it possible to considerably increase the equipment productivity and the product output from a unit production area.

The high coke value of the hydrocarbon-phenol-formaldehyde resin ensures a high heat-resistance and thermal stability of materials prepared therefrom.

The high curing rate of the resin makes it possible to substantially increase productivity of the equipment per unit time in the manufacture of final articles.

What is claimed is:

1. A process for producing a hydrocarbon-phenol-formaldehyde resin comprising a continuous polycondensation of the anthracene fraction of coal tar boiling at a temperature within the range of from 270° to 350° C., phenol and formaldehyde at a weight ratio between said components of 1:3–4:1–1.2 respectively, in the presence of 0.5 to 1.2% by weight of an acidic catalyst at a supply rate of a mixture of said components of from 500 to 550 g/hr.

2. A process as claimed in claim 1, wherein as the acidic catalyst use is made of hydrochloric acid.

3. The product obtained by the process of claim 1.

* * * * *